Aug. 19, 1969   G. L. CONGER   3,461,627
SEALING DEVICE FOR LOADING DOCKS AND THE LIKE
Filed Sept. 18, 1967
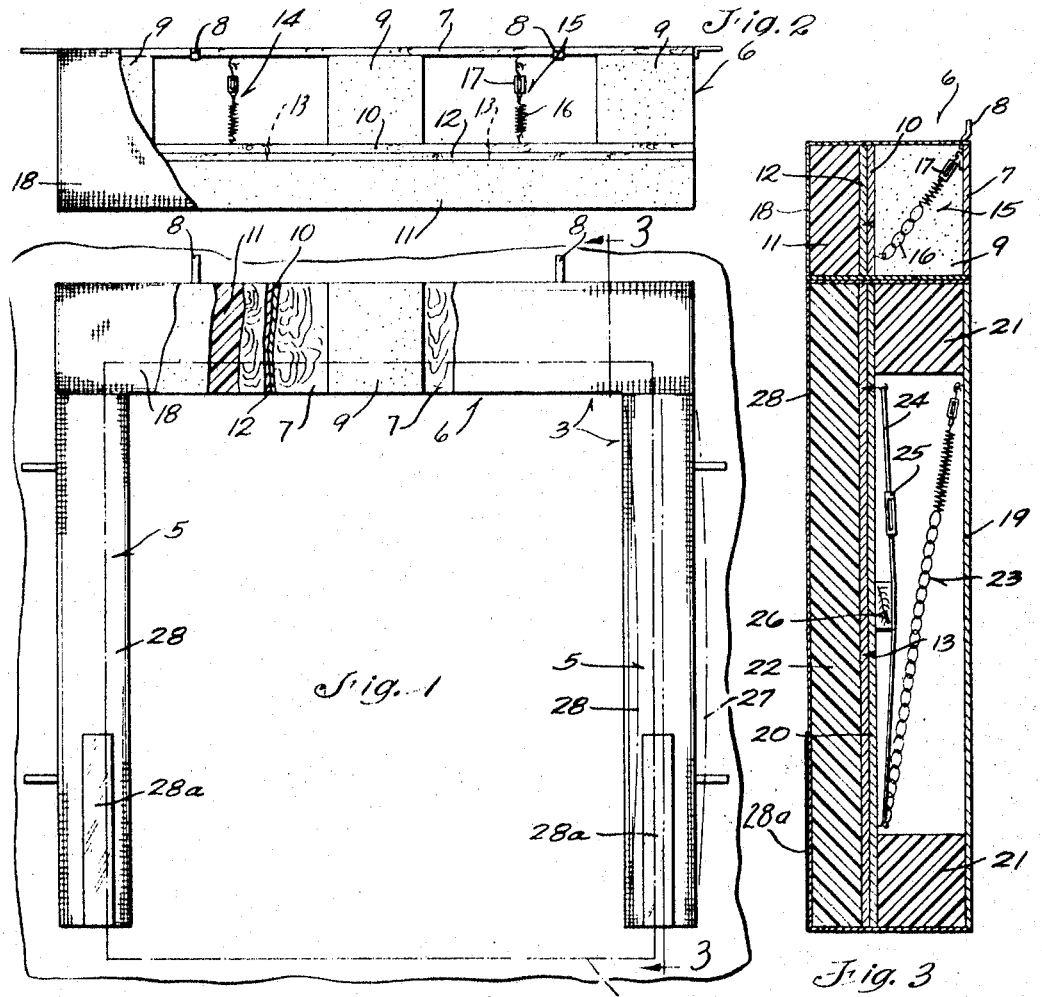
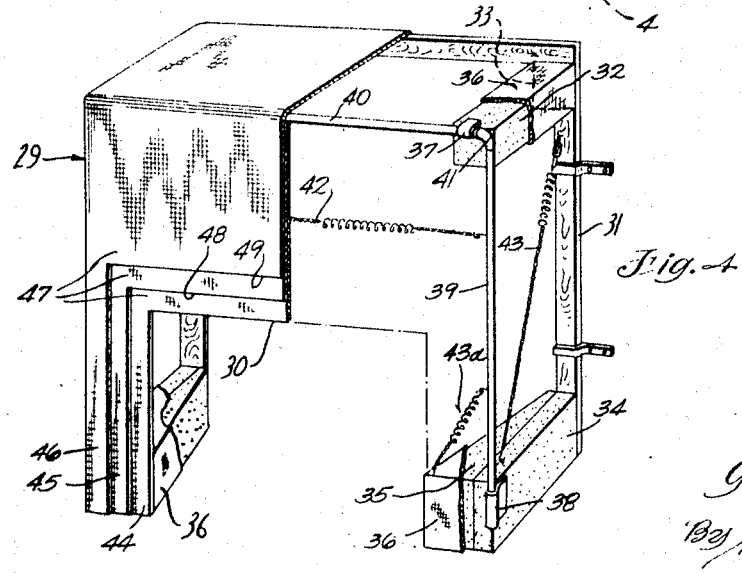
Inventor
Gary L. Conger
By Andrus & Starke
Attorneys United States Patent Office 3,461,627
Patented Aug. 19, 1969

3,461,627
SEALING DEVICE FOR LOADING DOCKS
AND THE LIKE
Gary L. Conger, 3043 W. Mason St.,
Green Bay, Wis. 54301
Filed Sept. 18, 1967, Ser. No. 668,452
Int. Cl. E06b 1/56, 1/32; E04h 12/18
U.S. Cl. 52—204                14 Claims

ABSTRACT OF THE DISCLOSURE

A dock shelter includes a generally inverted U-shaped pad assembly formed of individual top and side walls or with integral walls. Blocks or pads of a polyurethane plastic are connected to a mounting frame and interconnected by a similar U-shaped front mounting wall assembly. A continuous polyurethane sealing pad is secured to a mounting wall which is attached to the front mounting wall assembly. Linkages including a chain and spring are connected between the frame and front mounting wall assembly to transfer the weight of the sealing pad to the support and thereby prevent the tendency of the sealing pads to sag. The total assembly may be covered with a suitable canvas or the like. In an alternative structure, the corner blocks or pads are connected to the mounting support and a framework of pipe or the like is secured to the forward ends of the pad and covered with a canvas to define the opening generally in accordance with that of a truck or the like. The dock shelter again accommodates the truck movement and provides a relatively firm seal therebetween. The sealing structure is thus permitted to move with respect to the building with the truck and without relative motion between the sealing pad and the truck.

---

This invention relates to a shelter for loading docks and the like and particularly to a shelter which is adapted to be fixed about an opening or doorway to close the opening about an adjacent conveyance means.

Dock closure or seal structures have been suggested which are adapted to close the opening about the open back of a truck van and a dock doorway. Generally, a resilient member is secured about the top and side wall portions of the exterior of the doorway. The loading conveyance such as the truck backs into alignment with the doorway and into engagement with the sealing structure. In some cases, the sealing structure is actually abutted by the rear end of the truck and compressed to form a weather-tight seal. In other systems, the truck backs against a suitable curtain structure which snugly fits about the truck door to provide a weather-tight tunnel or enclosure.

Satisfactory units have employed resilient foam-like pads, air-filled members and canvas covered linkage structures.

A particularly severe wear problem is encountered, particularly with the seals or shelters which are actually abutted by the truck to form the seal, as a result of the relative movement of the truck or other conveyance as it is loaded and unloaded. As the truck is unloaded, the weight is reduced and the truck tends to rise. As a result of the substantial forces which normally exist between the sealing pad and the truck and the fact that the upper end of the truck may actually be embedded within the pad provides a source of rapid destruction to the outer surfaces of the dock or shelter structure.

The present invention is particularly directed to a shelter or seal which can readily accommodate unusual movement of the truck or other conveyance.

Generally, in accordance with the present invention, the sealing structure includes corner supports establishing a universal joint for interconnecting of the sealing portion of the structure to the building such that the sealing structure is permitted to move with respect to the building with the truck and without relative motion between the sealing surface itself and the truck. In a preferred construction, the seal structure includes a generally inverted U-shaped pad assembly of resilient pads interconnected to a mounting support by universal corner connections which in a particularly important aspect of this invention are in the form of blocks of a resilient material such as a polyurethane or similar foam material presently employed in dock shelters. The total assembly may be covered with a suitable canvas or the like. A support means is provided between the mounting support and the sealing pad assembly to transfer the weight of the sealing pad assembly to the support and thereby prevent the tendency of the sealing pads to sag.

In an alternative structure, the corner blocks are connected to the mounting support and a framework of pipe or the like is secured to the forward ends of the pad and covered with a canvas to define an opening generally in accordance with that of a truck. The truck backs against the canvas structure to establish the weather-tight seal therebetween.

The present invention thus provides an inexpensive and reliable foam type seal for docks and the like in which the relative movement of the truck during the loading and unloading as well as the initial positioning of the truck is readily accommodated.

The drawings furnished herewith illustrate preferred constructions of the present invention in which the above advantages and features are clearly disclosed as well as others which will be clear from the subsequent description.

In the drawings:

FIG. 1 is a front elevational view of a dock shelter constructed in accordance with the present invention affixed to a truck dock;

FIG. 2 is a top elevational view with parts broken away to show further details of construction;

FIG. 3 is a sectional view taken generally on line 3—3 of FIG. 1 to show details of construction; and FIG. 4 is a view of an alternative construction in accordance with the present invention.

Referring to the drawings and particularly to FIG. 1, the present invention is shown enclosing a doorway 1 is a warehouse building 2 or other similar structure. Generally, a dock shelter unit 3 is secured about the sides and top of the doorway 1 and projects inwardly into the doorway opening to accommodate the back face of a truck 4 or other conveyance means partially shown in FIG. 2. The truck 4 moves into abutting relationship with the dock shelter unit 3 to form a firm weather-tight closure or seal between the truck 4 and the doorway 2.

More particularly, the dock shelter unit 3 which particularly forms the subject matter of the present invention includes a pair of similar rectangular side wall assemblies 5 and a rectangular top wall assembly 6.

The top wall assembly 6 is constructed as shown in FIG. 2 and includes a mounting support or wall 7 formed of plywood or any other similar rigid type material. A plurality of steel anchors or mounting straps 8 are secured in spaced relation to the back wall 7 and each terminates in an outwardly projecting apertured attachment lip for mounting of the corresponding top wall assembly 6 of the dock shelter to the building 2. The top wall assembly 6 in the illustrated embodiment of the invention includes three similar block-like mounting pads 9 secured to the mounting wall 7 and projecting forwardly therefrom from the ends and center of the wall 7. The pads 9 are formed of a flexible or resilient spongy material; for example, polyurethane material which is widely employed as the sealing portion of the dock shelter. The pads 9 are secured to the wall 7 in any suitable manner, preferably by a suitable adhesive which can be readily obtained commercially. A front board or wall 10 is similarly secured by an adhesive to the forward end of the pads 9. A continuous sealing pad 11 is secured to a backing wall 12 which in turn is interconnected as by a plurality of screws 13 to the front wall 10, in the illustrated embodiment of the invention.

In accordance with another feature of the present invention, a pair of supporting links 14 and 15 is connected between the mounting wall 7 and the front wall 10 to transmit the weight of a sealing pad 11 directly to the wall 7 and thereby to the warehouse. This removes the weight from the pads 9 and essentially eliminates sagging. In the illustrated embodiment of the invention, each supporting linkage includes a chain member 16 interconnected at one end to the lower edge of the front wall 10 and projecting upwardly and rearwardly with the opposite end of the chain member 16 connected by a spring and a turnbuckle unit 17 to the top portion of the wall 7. This support has been found to provide a level arrangement without sagging of the structure under the weight of the foam pad and the framework in the absence of a truck 4 while permitting freedom of movement as hereinafter described.

The top wall unit 6 is covered with a weatherproof fabric cover 18 which may be the usual covering material applied to known solid seals or any other suitable material.

The side wall assemblies 5 are similarly constructed and each includes a back mounting wall 19 interconnected to a front wall 20 at the bottom and lower end by a similar mounting pad 21. A foam sealing pad 22 is attached to wall 20 as in assembly 6. A single chain and linkage unit 23 interconnects the lower end of the sealing pad wall 20 to the upper end of the mounting wall 19 to similarly support the side wall assemblies against sagging and the like while allowing relatively unrestricted movement thereof.

The side wall units or assemblies 5 include a strength brace or cable 24 secured to the top and bottom portions of the board or wall 20 and includes a tightening turnbuckle unit 25. A block 26 of wood or the like is secured to the wall 20 with cable 24 passing thereover such that tightening of the turnbuckle unit 25 tends to bow the wall 20 outwardly. Although not essential to this invention in its broadest aspect, this structure has been found to essentially eliminate the tendency of the assemblies 5 to bow or deform laterally, as shown in phantom at 27, when a truck backs against the shelter. Apparently the back door hinge structure of the truck acting on the units 5 tends to create end forces which bow the units with tight seals only at the ends. The cable 24 prevents this result.

Further, the structure of cable 24 may be applied to the top wall unit 6 and the central pad 9 removed if desired.

The side wall assemblies 5 similarly include a suitable fabric cover 28 which may include a centrally located locating or guide strip 28a, preferably formed of a reflecting material.

In operation, the top and side wall assemblies 5 and 6 are interconnected about the doorway 2, as shown in FIG. 1. The truck 4 backs into sealing engagement with the front foam sealing pads 11 and 22.

The foam pads 11 and 22 as well as the corner pads are compressed with the sealing pads 11 and 22 overlapping the truck about the corresponding sides and top of a truck to form a snug seal that prevents air leakage and the like.

In accordance with the present invention, as the truck 4 is unloading, it rises. In the present invention, the mounting pads 9 and 21 of the structure permit ready movement of the total structure upwardly with the truck; the pads 9 and 21 deflecting upwardly and providing movement of the dock shelter unit 3 without relative movement between the sealing pads 11 and 22 and the end of the truck.

Similarly, in the event that the truck is unloaded when originally positioned in the sealing engagement with the dock shelter unit 3, the dock structure can follow the downward movement as it is loaded with the foam pads deflecting. The spring connections and linkages which normally support the weight of the pads 11 and 22 permit the movement downwardly.

The resilient plastic corner supports 9 and 21 have been found to provide a highly satisfactory universal connection. Within the broadest aspect of this invention, any other suitable similarly functioning means might be employed. For example, coil springs might be employed and still permit generally universal movement.

Similarly, the mounting pads allow lateral movement if for any reason lateral movement of the truck occurs during the loading or unloading or even during the movement into sealing engagement. For example, in certain cases the back of the truck may not engage the sealing pads 11 and 22 in a vertical plane but at some angle tending to compress the lower or top end more than the opposite end. The present invention will readily accommodate such movement.

When the doorway 1 is closed, the sealing structure is firmly held in position with the auxiliary supports essentially eliminating the tendency of the foam pad structure to sag. The front sealing pads 11 and 22 can be made with a relatively minimum thickness as the mounting pads permit some compensation. The total weight of the unit can therefore be somewhat reduced.

The present invention might also be applied to dock enclosures for larger doors or openings; for example as shown in FIG. 2.

In the second embodiment, a U-shaped fabric covered frame shelter 29 defining a U-shaped opening 30 for alignment with the truck opening is shown.

The shelter includes an inverted U-shaped mounting frame 31 attached to the building warehouse. The top corner portions of frame 31 are enlarged and block-type flexible pads 32 are secured thereto by a suitable adhesive. The pads 32 have a generally rectangular cross section. The bottom of each side leg of the mounting frame 31 is provided with generally rectangular mounting portions 33 of a somewhat lesser width than the top or upper pads 32 but of a somewhat slightly greater vertical depth. Rectangular flexible pads 34 are similarly secured to the corner lower portion 33 and projects therefrom with the outer surface in a coplanar relationship with the top pads 32. Generally triangular-shaped pads 35 are secured to the inner faces of the bottom corner pads 34 with the base coplanar with the outer ends of such corner pads.

The several corner pads 32, 34 and 35 are similarly covered with a suitable protective fabric cover 36. Additionally, a similar fabric loop 37 is attached to the top edge of the cover 36 of pads 32 and similar fabric loops 38 are attached to the outer edges of covers 36 of pads 34. In the illustrated embodiment, the covers 36 are formed with a seam in the location of the loops 37 and 38 which are sewed directly into the seams.

A pair of vertical side rods 39 such as tubular pipes or other corresponding members are passed through the loops 38 and connected at the top to a similar top rod 40 which passes through loops 37, in any suitable manner, such as the 90-degree elbows 41 to define a generally U-shaped framing structure about the outer edges of the unit. A support cable 42 is shown secured between the vertical side rods 39 adjacent the upper ends thereof to prevent lateral spreading during the use of the shelter.

Similar support linkages 43 interconnect the lower end of each vertical rod 39 immediately above the bottom pads 34 to the upper portion of the corresponding side leg of the mounting frame 31 to similarly support the side wall structures. Additionally, similar small linkages 43a may interconnect the outer end of each triangular pad 35 to the side or vertical rods 39 to support the corresponding lower pad structures against sagging while permitting relatively unrestricted flexing movement thereof if necessary.

The total assembly is covered with a multiple layer fabric enclosure defining the U-shaped opening and an encircling front wall which is engaged by the back of a truck.

The illustrated fabric enclosure includes a useful and novel feature defined by a similar plurality of three overlapping front panels 44, 45 and 46 of varying width secured to the opposite sides of the opening and similar overlapping panels 47 secured to the top of the opening. The panels 44–46 extend to the upper edge of the shelter and are interleaved with the top panels 47 to define a plurality of secondary larger openings 48 and 49.

The truck will normally have a width in excess of the opening 30 and sealingly engage the front of the shelter. If the width is only slightly greater than the opening 30 defined by the innermost panels 44 and 47, the back of the truck engages such innermost panels and moves through the secondary openings defined by the outer panels 45, 46 and 47 which may engage the outer side and top surfaces of the truck to form a secondary seal. If the width of the truck is substantially greater than the opening, the back of the truck engages the appropriate outer panels. The four flexible corner pads accommodate any relative movement thereof during the loading and unloading and the like.

The structure of FIG. 4 is particularly adapted to door openings of 10 feet whereas the first embodiment is for 8-foot door openings. Thus, it is generally impractical to construct a continuous foam sealing pad which can project inwardly of a 10-foot door sufficiently to seal the opening about the smaller width truck. The canvas or fabric structure of FIG. 4 is readily constructed to accommodate the different widths.

The complete flexible movement of the shelter structure of the present invention has been found to provide a reliable means of eliminating the normal abrasive forces or actions established between the usual shelter structure and a truck or other conveyance with an excellent weathertight seal about the conveyance over long periods.

Various modes of carrying out the invention are contemplated as being within the scope of the following claims particularly pointing out and distinctly claiming the subject matter which is regarded as the invention.

I claim:

1. A doorway shelter for closing the opening between a building unit and a conveyance, comprising
   a top and side wall resilient sealing pad assembly of a substantial thickness to establish sealing engagement with the conveyance,
   a plurality of spaced universal movable support means secured to the top and side wall sealing pad assembly, and
   means to secure said movable support means to the building and forming the support for the sealing pad assembly and holding said sealing pad assembly in outwardly spaced relation to the building and said support means permitting essentially unrestricted individual and simultaneous lateral horizontal and vertical limited movement of the sealing pad assembly on said support means to accommodate vertical and lateral horizontal movement of a conveyance in sealing engagement with said pad assembly.

2. The door way shelter of claim 1 wherein said universal movable support means includes a plurality of spaced resilient pads secured to the top and side wall resilient sealing pad assembly.

3. The doorway shelter of claim 1 having resilient support means connected to the top and side wall assembly and adapted to be connected to the building unit to support the assembly and essentially remove the weight of the assembly from said movable support means.

4. The doorway shelter of claim 1 including
   a mounting frame means having means for attachment to a building,
   said movable support means including a plurality of resilient pads secured to the mounting frame in spaced relation to each other about the frame, and
   said top and side wall unit including resilient elongated sealing pads connected to said support pads.

5. The doorway shelter of claim 1 including
   a mounting frame means having means for attachment to a building,
   said movable support means including a plurality of resilient polyurethane pads secured to the mounting frame in spaced relation to each other about the frame, and
   said top and side wall assembly including resilient elongated sealing polyurethane pads connected to said support pads.

6. The doorway shelter of claim 1 having
   a separate top wall assembly and a pair of similar side wall assemblies arranged with the top wall assembly spanning the side wall assemblies,
   a plurality of horizontally spaced universal movable support means secured to the top assembly,
   a plurality of vertically spaced universal movable support means secured to each side wall assembly, and
   means to secure said movable support means to the building and permitting essentially unrestricted limited movement of the top and side wall assemblies to accommodate the movement of a conveyance.

7. The doorway shelter of claim 6 wherein said universal movable support means are each a similar pad of a resilient material.

8. The doorway shelter of claim 6 wherein
   each of said wall assemblies includes a mounting frame member, resilient support pads secured to the frame member and defining said movable support means, a sealing pad of a resilient material extending continuously across the length of the wall assembly, a wall means secured to the back of said sealing pad and to the front of said support pads, a resilient supporting linkage connected to the lower end of said wall means and to the upper end of the mounting frame member.

9. The doorway shelter of claim 6 wherein said top wall assembly includes a mounting frame member adapted to be secured to the building, three support pads of a resilient material secured to the mounting frame member, a top sealing pad extending coextensively of the top wall assembly, a wall means secured to the back of the top sealing pad and to support pads, and resilient supporting linkages connected between the top of the frame member and the bottom of the wall means.

10. The doorway shelter of claim 1 having similar side wall assemblies each of which includes a pair of spaced resilient support pads secured to the frame member, a continuous front sealing pad, a rigid wall means secured to the front of said support pads and the back of said sealing pad, a centrally located brace member secured to the back of the wall means between said resilient support pads, and a strengthening cable secured at the opposite ends to the top and bottom portion of said wall means and passing over said brace member.

11. The doorway shelter of claim 10 wherein a tightening means is connected in said cable.

12. A doorway shelter for sealing engagement with the back wall of a truck or the like, comprising
   a mounting frame structure having a top wall and side walls, means for securing the mounting frame to a doorway, a plurality of resilient mounting pads secured to said top wall and to said side walls in spaced relation to each other, and a resilient sealing pad assembly secured to the front ends of said resilient pads and having a top panel and side panels of a sufficient thickness and located to establish sealing engagement with the truck, said mounting pads holding said sealing pad assembly in outwardly spaced relation to the mounting frame structure and defining a universal support for said sealing pad assembly and establishing corresponding movement of the sealing pad assembly with said truck.

13. The doorway shelter of claim 12 including separate side wall assemblies and a separate top wall assembly, said side wall assemblies each including a side mounting wall, a pair of resilient support pads secured to the top and bottom ends of said mounting wall, a front mounting wall secured to the forward ends of the sealing pads, a sealing pad, a wall secured to the back of said sealing pad and interconnected to said front mounting wall, and a resilient supporting linkage connected to the lower end of said front mounting wall and to the upper end of the side mounting wall.

14. A doorway shelter for sealing engagement with the back wall of a truck or the like, comprising a mounting frame having a top wall and side walls, means for securing the mounting frame to a doorway, a plurality of resilient mounting pads secured to said top wall and to said side walls in spaced relation to each other, said pads each having a cover and loop members secured to the outer edges of said covers, connecting rods passing through said loop members to secure said rods to the outer front edges of the mounting pads, and a flexible cover over the front and sides of said pads and connecting members, said mounting pads defining a universal support for said shelter and establishing corresponding movement of the shelter with said truck.

References Cited

UNITED STATES PATENTS

| | | | |
|---|---|---|---|
| 2,890,880 | 6/1959 | Hompe et al. | 61—48 XR |
| 3,181,205 | 5/1965 | Frommelt et al. | 52—173 XR |
| 3,286,417 | 11/1966 | Dazzo | 52—204 |
| 3,303,615 | 2/1967 | O'Neal | 52—173 XR |
| 3,375,625 | 4/1968 | Edkins et al. | 52—173 |

KENNETH DOWNEY, Primary Examiner

U.S. Cl. X.R.
52—173; 135—5